AUTOMATIC REVERTIVE CALLING OVER A MOBILE TELEPHONE SYSTEM

Filed Oct. 1, 1964 5 Sheets-Sheet 1

INVENTOR.
MARVIN F. MALM
BY
Delbert J. Warner
ATTORNEY

Nov. 12, 1968 M. F. MALM 3,410,963

AUTOMATIC REVERTIVE CALLING OVER A MOBILE TELEPHONE SYSTEM

Filed Oct. 1, 1964 5 Sheets-Sheet 5

United States Patent Office 3,410,963
Patented Nov. 12, 1968

3,410,963
AUTOMATIC REVERTIVE CALLING OVER A MOBILE TELEPHONE SYSTEM
Marvin Forest Malm, Tinley Park, Ill., assignor to International Telephone and Telegraph Corporation, a corporation of Delaware
Filed Oct. 1, 1964, Ser. No. 400,731
9 Claims. (Cl. 179—41)

ABSTRACT OF THE DISCLOSURE

A system is provided for automatic establishment of revertive calls between two mobile subscribers in an automatic mobile telephone network where only a single two-way radio channel is available to complete a connection.

This invention relates to mobile telephone systems operable through automatic dialing systems and more particularly to means for coupling two mobile stations through such automatic dialing systems when only one two-way channel, capable of utilizing one receiver frequency and one transmitter frequency is available to each station.

The automatic telephone systems to which the present invention has most immediate application make possible automatic dialing and speaking without recourse either to an operator or to manual operation of "talk" and "listen" cycles between a fixed and a mobile station. The most costly single items in such automatic telephone systems for linking land based telephones and mobile telephones are the radio channels. For that reason, and also because of restrictions on the number of licenses permitted for radio transmission, it is desirable to reduce the number of radio channels to a minimum. In the simplest possible case of one receiver and one transmitter at each station, suitable innovations make it possible to dial automatically and to carry on continuous two-way conversations between a ground based station and a mobile station. However, signals between two mobile stations interfere with each other if attempts are made to transmit them simultaneously over the same two-way channel. Recourse to manual control with alternate parties speaking and then listening is necessary and with prior art devices an operator has been necessary to make the initial connection between the two mobile stations. It is, therefore, an object of the present invention to make it possible to link two mobile stations through a conventional automatic dialing system and a radio system without the need for intervention by a human operator.

Figure 1:
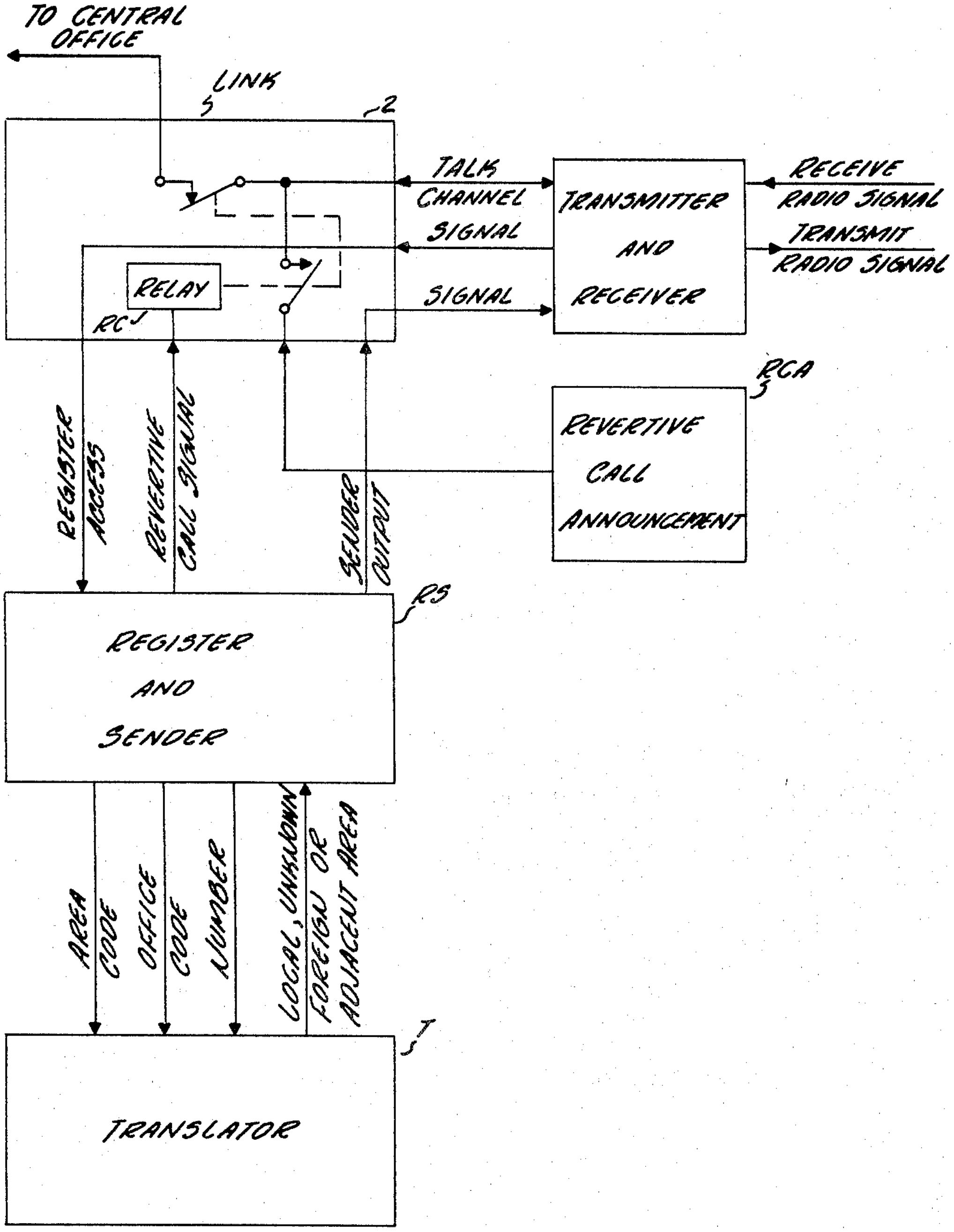
Figure 2A:
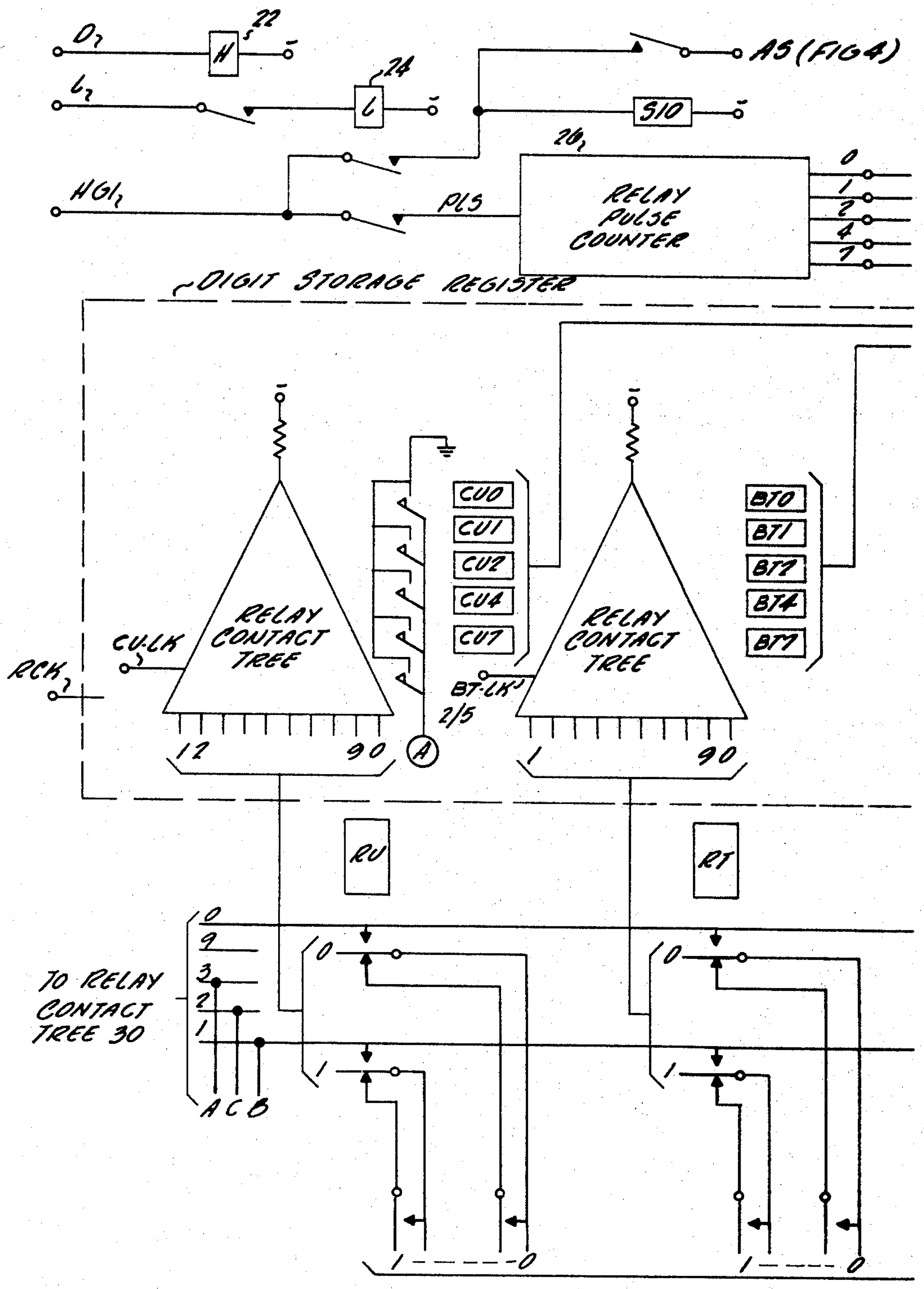
Figure 2B:
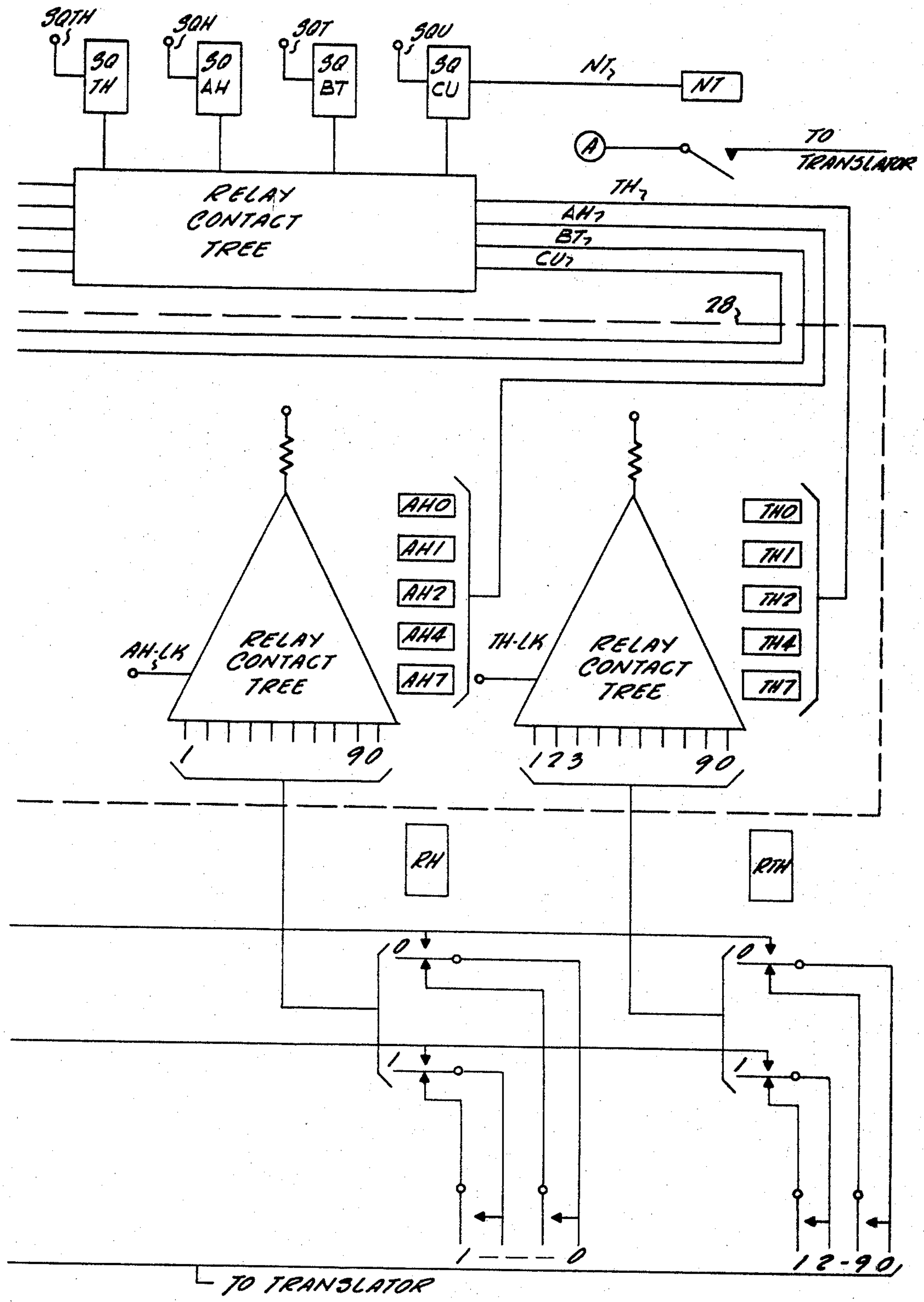
Figure 3:
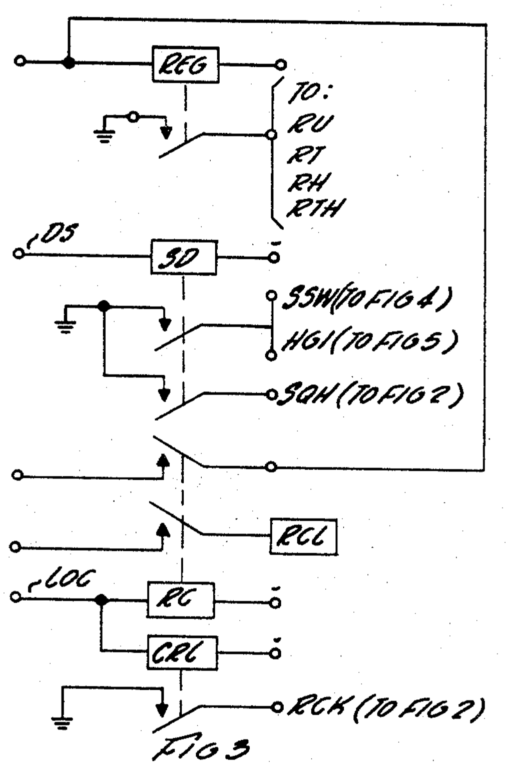
Figure 4:
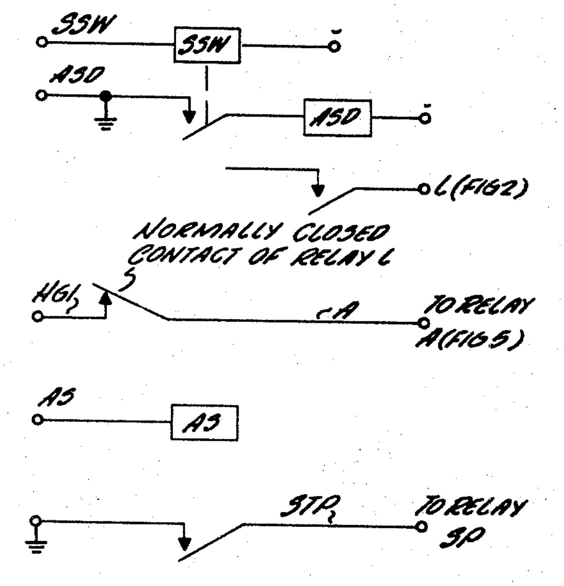
Figure 5:
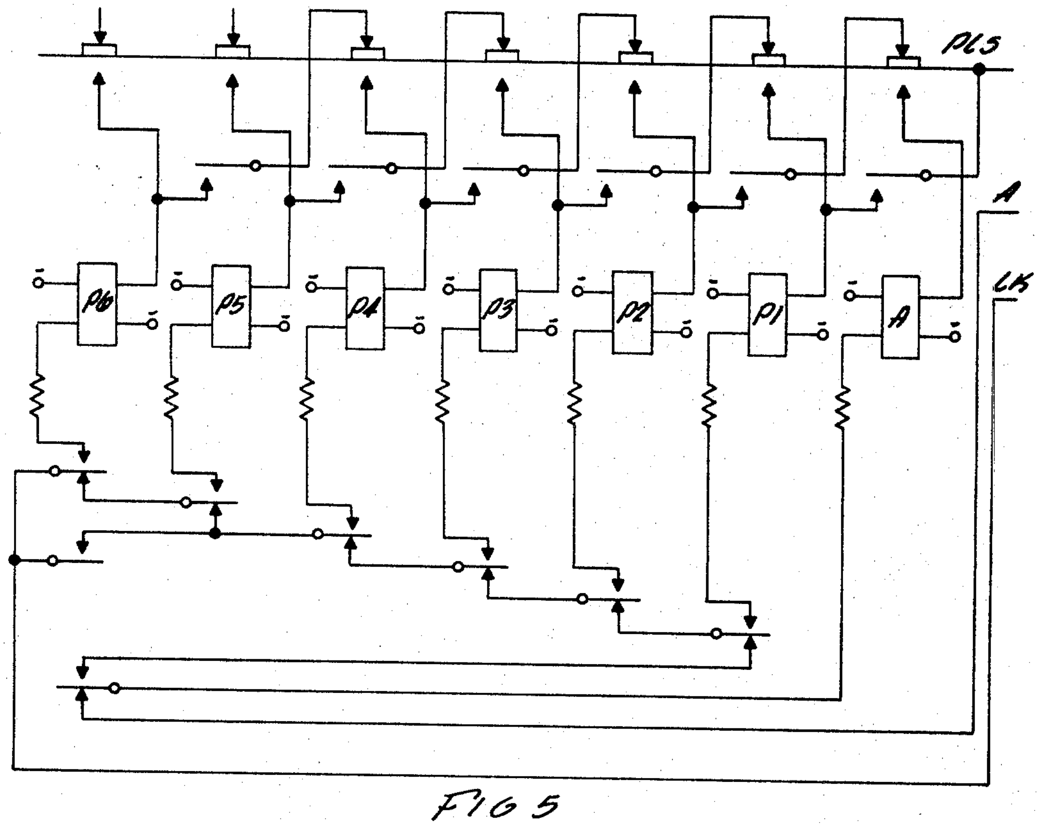
Figure 6:
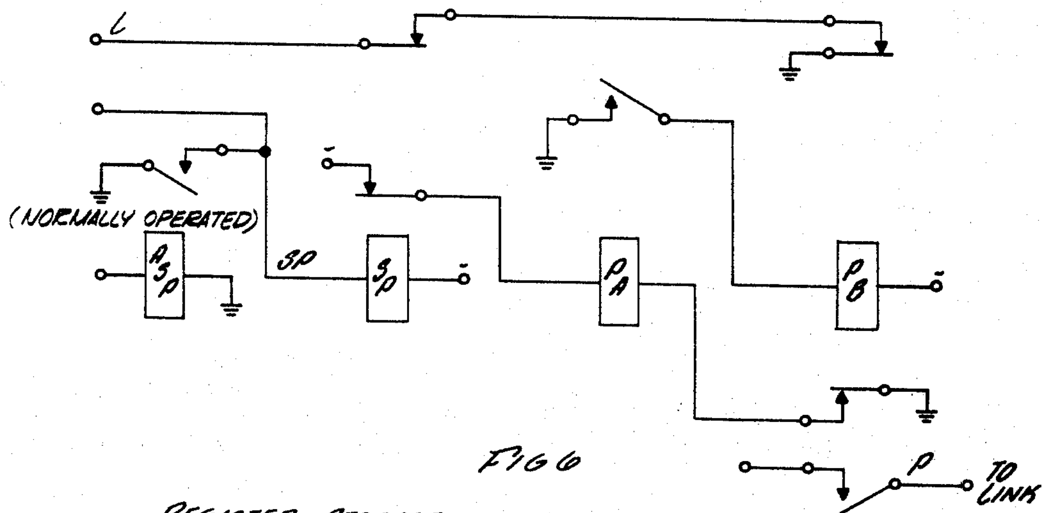
Figure 7:
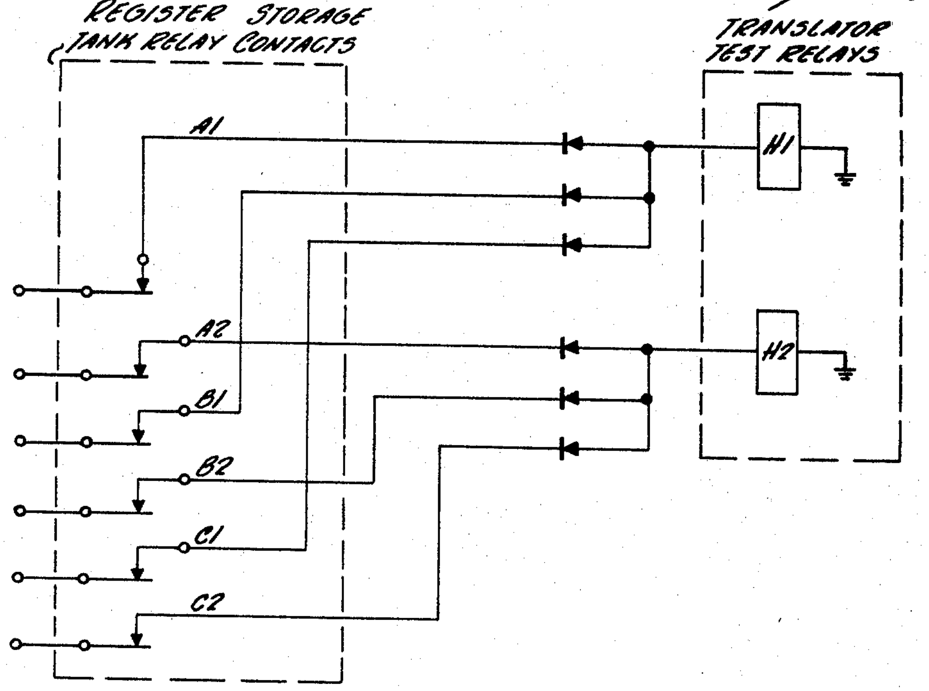

The above mentioned and other features of this invention and the manner of obtaining them will become more apparent, and the invention itself will be best understood by reference to the following description of an embodiment of the invention taken in conjunction with the accompanying drawings, in which:

FIG. 1 is a block diagram illustrating the overall functions of a land-to-mobile telephone system, FIG. 2 is a diagram showing an embodiment of the invention, FIG. 3 is a diagram showing certain relay connections, FIG. 4 is another diagram showing relay connections, FIG. 5 depicts the connections of a relay pulse counter of use in the present invention, FIG. 6 shows further relays and relay connections of interest in the present invention, and FIG. 7 illustrates the principle of operation of the translator used with embodiments of this invention.

In a preferred embodiment of this invention, signals representing the central office code (three digits) and the station number being called (four digits) are received by central office switching equipment from a mobile telephone station by dialing from the mobile station. If the station number being called is a mobile subscriber, the switching equipment, via a translator, determines that this is so, drops the connection through the central office and returns an announcement or distinctive tone indicating that a revertive call has been made to the calling subscriber. The announcement tells the calling subscriber that he must convert to the manual mode. Switching logic associated with the system then will process the call to the called mobile. The calling subscriber at this time will hear the tone pulses being outpulsed. If acknowledge tone is not received from the called station, the channel will be marked idle again and the calling subscriber will receive idle tone. If acknowledge tone is received, ringing will be outpulsed which will also be heard by the calling subscriber. If the called subscriber does not answer after 45 seconds or so, the link will release the call and the caller will again hear idle tone. If the called party answers, however, the same announcement or tone will instruct him to revert to manual operation. The announcement or tone will only be removed when the called subscriber's carrier disappears. The call will then proceed with each subscriber using the manual push-to-talk technique. A suitable speech path will be provided, through the link, until released by a timing circuit after carrier disappears.

A land-to-mobile telephone link is described in the copending U.S. patent application No. 363,851 filed by A. Lippert on Apr. 30, 1964, and assigned to the same assignee as the present invention. In that application, details are presented describing the functioning of means for automatically linking a mobile telephone and a land based telephone in response to manual dialing. The same or similar means can be employed to couple one mobile telephone with another mobile telephone when separate transmit and receive channels are available for each mobile telephone. Unfortunately, the described system will not function properly if only a single transmitter frequency and single receiver frequency are available at the ground link. Additional means, such as are given in the copended description of a preferred embodiment of this invention, are necessary in conjunction with the foregoing in order to call a mobile telephone from another mobile telephone via an automatic dialing system and using a single transmitter frequency and a single receiver frequency at the ground link.

Turning to FIG. 1, a general description of this invention may be presented together with certain useful background information. First of all, it is assumed that a call has been originated from a mobile station by removal of the handset at the station from its cradle. This step results, when the sending mobile is of the type referred to in the above referenced patent application, in an automatic signal of seven pulses duration identifying the area code to which the mobile is assigned and the mobile number of the mobile station. These pulses are supplied through the radio link and over the register access line to the Register-Sender or Register and Sender RS. The seven digits are compared over lines identified in FIG. 1 as Area Code (for the first three digits) and number (for the last four digits) in the Translator T, and if they correspond to numbers stored in the translator, a suitable signal will be transmitted via the Register-Sender RS to cause dial tone to be sent over the radio link to the mobile sender, and the register will be cleared to prepare it to receive dial pulses.

In response to dial tone, the calling mobile can then be operated as conventional dial equipment and the dial pulses will be monitored by the register. A comparison between the called office code and number will be made with the memory in the Translator T.

The translator will then supply an appropriate signal indicating whether the dialed number is unknown, a local number, or is a mobile number. In each case appropriate responses to these signals will be elicited in the register and in the link. However, the only response by the translator at this step, which is of immediate interest to this invention, is a signal identifying the called number as belonging to a mobile station in the same area.

If the called number is another mobile, RS will be caused to transmit a revertive call signal to operate the RC relay, to disconnect the line to the central office relays and connect a revertive call signal from block RCA to the talk channel. The calling mobile station will be advised by the revertive call signal, which may be a dial tone or a simple recorded message, that it must revert to the manual mode. The link 2 will recognize the absence of carrier signal when the calling station reverts to the manual mode and will begin to process the call back out by marking the channel idle for three seconds. At the end of the three second delay the link will seize the sender. The sender will then outpulse the seven digits from the register.

If the dialed mobile station is contacted through the radio link, it will be immediately advised by a revertive call announcement that it must convert to the manual mode of operation. The two mobile stations will then be linked through the radio channels and the link 2 so that they may talk in the manual mode, i.e. press to talk and release to listen.

For our purposes then it will be assumed that a mobile station his initiated a call to another mobile over a central office having only a single radio channel, i.e. one radio receiver and one transmitter. It will also be assumed that the calling mobile has been identified and in response to dial tone has dialed the three digit office code. He may then dial the four digits of the called party.

In order to better understand the sequence of events, turn to FIG, 2 wherein is found a simplified diagram of an actual register-sender of the kind used in a practical embodiment of this invention. The first symbol which should be noted in this figure is block 22 representing the coil of a hold relay H which is seized in response to a "register" command over lead D from the link 2 of FIG. 1. This relay closes a number of relay contacts, among which are an L contact which connects a Line Relay L to the Link 2 to receive incoming pulses from the sending mobile station. The relay L or 24 repeats each pulse it receives over a line HG1 (which is grounded during the period of interest) by connecting it to a line PLS.

The ground supplied over PLS by the closure of the L relay, as it repeats the pulses it receives, is applied to a pulse counter 26 composed in a preferred embodiment of six counting relays P1 . . . P6 (illustrated in FIG. 5) which are cross-coupled through their contacts so that they may count from one to ten pulses by maintaining the count on two relays at a time, e.g. closure of relays P1 and P6 after a pulse has been received would represent a count of 7.

After the first digit, of anywhere from 1 to 10 pulses has been counted by the pulse counter 26, a ground will be extended over contact points of the two operated relays to mark two of the leads 0, 1, 2, 4 and 7 shown to the right of block 26. For example, if a digit 1 was counted, the first relay P1 is operated and 0, 1, code for this digit will appear as ground on leads 0 and 1. Similarly, if a digit 9 has been counted, relays P6 and P3 would be operated and a ground would appear on leads 2 and 7.

The code marked as ground on two leads of the leads 0, 1, 2, 4 and 7 is supplied over appropriate lines or cables, CU, BT, AH, TH, controlled by relays SQTH, SQAH, SQBT and SQCU (which determine whether thousands, hundreds, tens or units are to be registered and the letters A, B and C serve as a reminder that the hundreds, tens and units forming the three digit area code or local office code will be processed over the hundreds, tens and units circuits) to the digit storage register indicated by the block composed of dashed lines 28. The digit storage register is composed of four storage tanks for recording thousands, A or hundreds, B or tens and C or units. It includes contact trees indicated by triangles each of which may receive 5 inputs through operation of 5 relays connected to receive signals from lines 0, 1, 2, 4 and 7. Contacts of the relays, for example those of relays BT0, BT1 . . . BT7, are numbered in such a way that a set of ten contacts indicated simply as 1 . . . 9, 0 at the base of the respective triangles provide a single ground (1 out of 10) over a single contact representative of the digit received by the digit storage register on a 2 out of 5 basis.

Thus far, the description has concerned the effect of one digit only and relates to the first digit received. This digit will ordinarily be the first digit of the ANI or mobile identification number consisting usually of seven digits made up of the 3 digit area code and the 4 digit called stations identification number. Since it is the first digit of the area code, it should be in the A or hundreds place and will be put in that place by operation of relay SQAH in response to ground signals from appropriate relay contacts which are not shown, but which operate in a well-known manner to distinguish and mark successive digits.

At the end of the first digit, relay SQAH releases, transferring control of the routing of the next digit to the SQBT relay. When the pulses of the second digit arrive one or more of the pulse counting relays P1–P6 in the pulse counter 26 are operated as before in response to pulses received through the contacts of the L relay 24. At the end of the digit, relay SQBT routes the 2 out of 5 code through the BT line to activate the appropriate BT0, BT1 . . . BT7 relays.

At the end of the second digit, relay SQBT releases and transfers the 0, 1, 2, 4, 7 digit registration leads via operated relay SQCU and lines CU to digit storage relays CU0, CU1 . . . CU7. The third digit, or the units digit, is received and registered by these relays on a 2-out-of-5 basis, in a manner similar to the receipt and registration of the second digit. In addition, relay SQTH is operated during the third digit to prepare it for the next digit.

When the third digit has been registered by the CU0, CU1 . . . CU7 relays, two relays in the group will be operative to encode the digit and ground will be placed on lead CU2/5. The ground on CU2/5 extends to the translator circuit, the ground serving to initiate the translation of the first three digits, which are the local office code. The translator circuit returns a ground mark to lead LOC of FIG. 3. This ground serves to operate a relay CRL which locks to lead RCK1, and opens the lock leads to the digit storage relays in block 28. When the stored digits are released, ground is removed from RCK–1 and relay RCL releases to reclose the holding grounds for the next digits to be stored. At this time, relay SQTH is operated in FIG. 2 in preparation for the thousands digit registration.

Assuming that the mobile has dialed the local office code, the register monitors the next 4 digits dialed. The thousands, hundreds, tens and units digits are registered in their respective storage tanks just as were the digits of the office code. When the units digit has been stored in a 2-out-of-five basis, lead 2/5 is grounded. Also lead NT is grounded via operated relay SQU. Relay NT is FIG. 2, operated locks and extends the 2/5 ground to the translator circuit on lead NT for translation of the 4-digit number in storage.

The translator compares information which has been previously programmed into its relay circuits with the four digit number which has just been dialed. The essence of the translating system is indicated in FIG. 7, where a relay H1 is shown to be held operated by leads A1, B1 and C1 and a relay H2 is shown to be held operated by leads A2, B2 and C2. To release H1, contacts A1, B1, and C1 must all be opened. Any one closed will hold H1 operated. The same is true about H2. All of the contacts connected to H2 must be opened before H2 will release.

Applying the method set forth in the last paragraph to the translator, each of the digit leads to which a controlling relay is connected, via the programming, must be marked with an open circuit in order to release the controlling relay. One released controlling relay will indicate a "match" has been found. Contacts on the released controlling relay are used to provide information to other circuits.

If the translation of the number is for a local mobile subscriber, lead LOC is grounded by the translator circuit. This ground serves to operate relay RC, via make contacts of relay NT and lead RC, to indicate that revertive call processing is required. In addition, other contacts of relay RC ground the AU–LK leads, to hold the number stored in the digit storage relays and to ground lead RC to the link circuit for reverting call indicating. Also, relay RC locks relay REG in FIG. 3 operated, this action serving to hold the absence-of-battery code markings of the digits in storage for the R–TH through R–U relays.

When the link circuit receives the reverting call indication, it releases the register and accesses the sender portion of the Register-Sender. It does this by removing the ground from lead D, to inactivate relay H of FIG. 2, thereby releasing the register. The link then returns an announcement or tone to the calling party and waits for him to revert to the manual mode of operation. When carrier disappears, the link cuts off the announcement or tone and returns idle tone to the channel for 3 seconds. The link then seizes the sender by grounding lead DS in FIG. 3. Ground on lead DS operates the relay SD which, in turn, operates relay SSW in FIG. 4 via lead SSW and relay A of FIG. 5 via lead HG1 over the normally closed contacts of Relay L and a lead A (FIG. 4). Other contacts of relay SD ground lead SQAH to operate relay SQAH. In FIG. 4 operated relay SSW grounds lead ASD to operate relay ASD. Operated, relay ASD in turn operates relay L of FIG. 2. Relay L extends the HG1 lead ground to relay S10 in FIG. 2, operating it. Relay S10 in turn operates relay AS, in FIG. 4, from the HG1 lead ground. Also with relays L and A operated, relay P1 operates.

Relay PA of FIG. 6 operates, operating relay PB. Pulses are delivered to the link circuit by the Sender as ground marks each time the relay PB operates. When relay PB operates, it removes ground from lead L, in FIGS. 2 and 6, causing relay L in FIG. 2 to release. Released, relay L removes ground from lead PLS (FIGS. 2 and 5) allowing relay A in the pulse counter 26, as illustrated in FIG. 5, to release. With relay A released and relay P1 operated, the circuit to relay P2 is prepared to the PLS lead.

When relay PB (FIG. 6) operated, it opened the circuit of relay PA, allowing it to release. Released, relay PA releases relay PB. With relay PB released, the circuit to relays L and PA are reclosed. Relay PA operates again, causing relay PB to operate and to ground lead P again as the second pulse to the Link circuit. Relay L, in operating, grounds lead PLS a second time, operating relay P2 as the count of the pulse.

Relays PA and PB continue to operate as a pulse generator, and the P1 . . . P6 relays of FIG. 5 as a counting train, until a stop-pulsing mark is read. The NPA digits are provided by means of strapping in FIG. 2, leads A, B and C being cross-connected to leads 1, 2, 3 . . . 9, 0 as required. Assuming a 312 NPA code, strapping shown in FIG. 2 for this code includes lead A connected to lead 3, lead B connected to lead 1 and lead C connected to lead 2.

With relay ASD (FIG. 4) operated at this time, a ground is extended through contacts of operated relay SQH to strapping lead A in FIG. 2. As the pulse generator (relays PA and PB) continues to deliver pulses, relay P3 operates on the third pulse. Since an NPA code of 312 has been assumed in the A–B–C lead strapping, no more than three pulses can be sent on each digit. Accordingly, when relay P3 operates, marking ground on one of its contacts is extended to relay SP of FIG. 6. Relay SP locks to lead STP and ground provided by relay AS.

Operated, relay SP opens the circuit of relay PA to stop the pulse generation. In addition, it opens the circuit of relay L, allowing it to release and remove holding ground for relays S10 and AS. In addition, the ground on lead STP that locked relay SP operated also served to operate SQBT in FIG. 2 via contacts of operated relay SQAH. When relay AS releases at the end of the next digit, it removes ground from lead STP, allowing relays SQAH and SP to release.

With relay SP released, the circuit of relay PA is again closed, and pulse generation begins for the second digit, Relays PB, L and the counting chain of P1 . . . P6 relays operate as before. The stop pulsing mark for the second digit of the NPA is provided by strapping lead B in FIG. 2. The pulses of relay PB are again extended to the link circuit via lead P. Relay SP operates to stop the pulsing as for the first digit and releases after a short time.

The third digit of the NPA is sent in a similar fashion, with the strap C of FIG. 2 controlling the routing for the pulse-stop marking ground. Relay SQCU is operated to route the ground to the C strap.

When relay SQCU of FIG. 2 releases at the end of the third digit of the NPA, ground is extended to relay RC of FIG. 3 and also to operate the relay RTH of FIG. 2 so that the resistance-battery and absence of resistance-battery of the thousands digit stored in FIG. 2 are now extended through make contacts of relay RTH to the 1, 2 . . . 9, 0 digit marking leads of FIG. 2.

When relay SP of FIG. 6 is released at the end of the third NPA digit, the circuit of relay PA is reclosed and pulse generation resumes. As the P1, P2 . . . P6 relays of the FIG. 5 counting chain count the pulses, resistance-battery or its absence, is present on the digit marking leads 1, 2 . . . 9, 0 that are associated with their make contacts. When relay PB of FIG. 6 operates during a pulse period and finds absence-of-battery on a particular digit mark lead from the thousands digit storage tank, indication is thereby given that this digit was the one in storage and that the pulse generator should be stopped. With the absence-of-battery now marked to it, relay ASP of FIG. 6 releases. Released, relay ASP now marks stop pulse lead SP with ground. Relay SP operates and ends the out-pulsing for the thousands digit.

The hundreds, tens and units are outpulsed in a similar fashion. For the hundreds digit out-pulsing, relay SQAH serves to supply relay RH for the hundreds digit registered. Relay SQBT and SQCU are used respectively to operate relays RT and RU for the tens and units digit stop-pulsing, absence-of-battery marks.

When relay RU operates for the outpulsing of the units digit, it locks to ground at contacts of relay ASD. When relay SQCU releases at the end of the units digit, ground is extended to relay SP and to the link circuit to indicate that the end of pulsing has been reached. The link circuit then releases the Sender circuit and continues to process the revertive cell as indicated heretofore.

While the principles of the invention have been described above in connection with specific apparatus and applications, it is to be understood that this description is made only by way of example and not as a limitation on the scope of the invention.

What is claimed is:

1. An automatic mobile telephone system comprising:

a switching office, a plurality of mobile telephone stations, a radio link for connecting said switching office for two-way communication to one mobile station at a time, means in said switching office for determining when a calling mobile station is seeking to reach another mobile station, means for directing said calling mobile station to convert to a manual mode of operation when said called station is a mobile station, and means for ringing said called mobile station in response to signals originated by said calling mobile.

2. An automatic mobile telephone system substantially as claimed in claim 1 in which the means for ringing said called mobile includes;

register means for recording said number to be called, and means for connecting said register to outpulse calling signals over said radio link.

3. An automatic mobile telephone system substantially as claimed in claim 1 in which the means for determining when a called mobile station is seeking to reach another mobile station comprises:

register means for recording said number to be called, and translator means containing records of mobile stations which may be called and with which said number to be called may be compared.

4. An automatic mobile telephone system substantially as claimed in claim 1 in which the means for ringing said called mobile includes:

register means for recording said number to be called, means for connecting said register to outpulse calling signals over said radio link, and pulse generating means to supply pulses to be outpulsed as calling signals by said register.

5. An automatic mobile telephone system substantially as claimed in claim 1 in which the means in said switching office for determining when a calling mobile is seeking to reach another mobile station includes electromagnetic relays.

6. An automatic mobile telephone system comprising a transmitter receiver including a land based transmitter and a land based receiver, a link circuit, a register-sender capable of functioning to register incoming signals and to control outgoing signals, means for coupling said transmitter-receiver and said link circuit to receive dial pulses from a calling mobile station, means for coupling said link circuit to said register-sender to register said dial pulses in said register-sender, a translator incorporating programmed memories of permissible mobile station numbers, means for comparing the contents of said register portion of said register-sender with the programmed memories in said translator to determine when the calling mobile station is calling a mobile station permitted to receive the call, means in said register-sender for sending pulses over said link circuit and said transmitter, in accordance with the contents of the register, to call a permitted mobile station, and means is said register-sender to direct signals through said link to said calling mobile directing attention to the fact that a mobile station has been called and commanding the calling mobile to convert to the manual mode of operation.

7. An automatic mobile telephone system substantially as claimed in claim 6 in which said register-sender comprises:

a pulse counting chain linked to individual storage devices which record the number of pulses counted for each dialed digit.

8. An automatic mobile telephone system substantially as claimed in claim 6 in which said register-sender comprises:

a pulse generating circuit for providing output pulses equal in number to the number of pulses registered originally by the register portion of the register-sender.

9. An automatic mobile telephone system substantially as claimed in claim 6 in which the register-sender includes electro-magnetic relays to perform the desired functions.

References Cited

UNITED STATES PATENTS

| | | | |
|---|---|---|---|
| 3,050,591 | 12/1958 | Dimmer | 179—41 |
| 3,087,228 | 1/1958 | Stewart et al. | 343—228 |
| 3,105,118 | 9/1963 | Berglund | 325—55 |

KATHLEEN H. CLAFFY, *Primary Examiner.*

A. H. GESS, *Assistant Examiner.*